United States Patent [19]

Szmuskovicz

[11] 3,862,950

[45] Jan. 28, 1975

[54] DIBENZO[B,F]-S-TRIAZOLO[4,3-A][1,4]DIAZEPIN-3-ONES

[75] Inventor: Jacob Szmuskovicz, Kalamazoo, Mich.

[73] Assignee: The Upjohn Company, Kalamazoo, Mich.

[22] Filed: Aug. 7, 1973

[21] Appl. No.: 386,276

Related U.S. Application Data

[63] Continuation-in-part of Ser. No. 307,113, Nov. 16, 1972, abandoned, which is a continuation-in-part of Ser. No. 220,405, Jan. 24, 1972, abandoned.

[52] U.S. Cl. ........... 260/268 PC, 71/92, 260/247.2, 260/293.59, 260/308 C, 424/248, 424/250, 424/267, 424/269
[51] Int. Cl.. C07d 57/02, C07d 57/04, C07d 99/02
[58] Field of Search ...... 260/308 C, 268 PC, 293.59

[56] References Cited
UNITED STATES PATENTS

| | | | |
|---|---|---|---|
| 3,201,404 | 8/1965 | Ruschig et al. | 260/308 C |
| 3,514,466 | 5/1970 | Stable et al. | 260/308 C |
| 3,644,334 | 2/1972 | Ning et al. | 260/239 BD |
| 3,646,055 | 2/1972 | Hester, Jr. | 260/308 C |

*Primary Examiner*—Alton D. Rollins
*Attorney, Agent, or Firm*—Hans L. Berneis

[57] ABSTRACT

Compounds of the formula III:

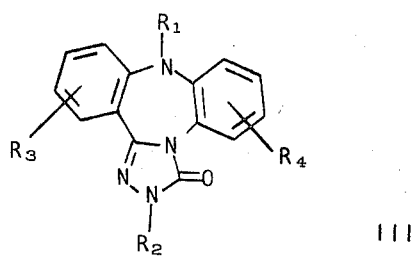

wherein $R_1$ is hydrogen, alkyl of 1 to 3 carbon atoms, inclusive,

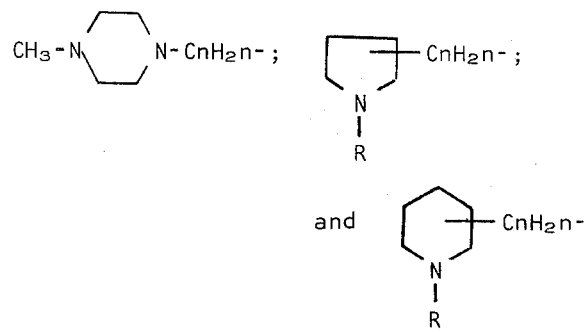

in which n is 2 to 3, inclusive, and R is alkyl defined as above, or $R_1$ is

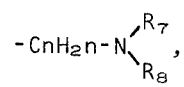

in which n is defined as above and $R_7$ and $R_8$ are hydrogen or alkyl, as defined above, or

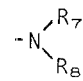

together is pyrrolidino, or piperidino; wherein $R_2$ has the same significance as $R_1$; wherein $R_3$ and $R_4$ are hydrogen, fluoro, chloro, bromo, alkyl defined as above, trifluoromethyl, or alkylthio, of 1 to 3 carbon atoms, inclusive, are prepared by reacting a thio compound of formula I:

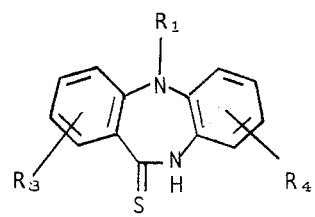

wherein $R_1$, $R_3$, and $R_4$ are defined as above, in sequence:

1. with an alkylcarbazate; and the resulting product II
2. with an alkylating agent of the formula $R_2'Cl$ in which $R_2'$ equals $R_2$ exclusive of hydrogen, to obtain a compound III as defined above.

Compounds of formulae II and III and the pharmacologically acceptable acid addition salts thereof have anti-depressant and anti-anxiety activity and can be used in mammals.

17 Claims, No Drawings

DIBENZO[B,F]-S-TRIAZOLO[4,3-A][1,4]DIAZEPIN-3-ONES

CROSS REFERENCE TO RELATED APPLICATION

This application is a continuation-in-part of application Ser. No. 307,113 filed Nov. 16, 1972, now abandoned, which is a continuation-in-part of application Ser. No. 220,405, filed Jan. 24, 1972, now abandoned.

BACKGROUND OF THE INVENTION

1. Field of the Invention

This invention is directed to new organic compounds and is particularly concerned with novel compounds II and III and a process for the production thereof.

The novel compounds and the process of production therefor can be illustratively represented as follows:

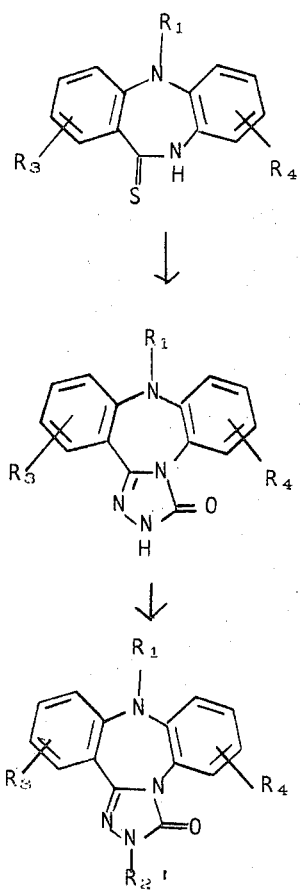

wherein $R_1$ is hydrogen, alkyl of 1 to 3 carbon atoms, inclusive,

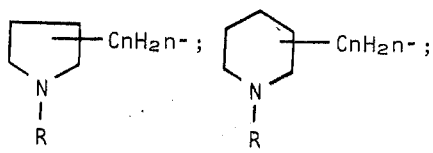

and $CH_3-N\underset{\phantom{x}}{\diagup\!\!\!\diagdown}N-C_nH_{2n}-$

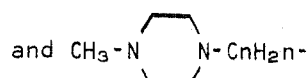

in which $n$ is 2 or 3, inclusive, and R is alkyl defined as above, or $R_1$ is

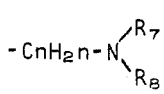

in which n is defined as above, $R_7$ and $R_8$ are hydrogen or alkyl, as defined above, or

together is pyrrolidino, or piperidino; wherein $R_2'$ is alkyl of 1 to 3 carbon atoms inclusive;

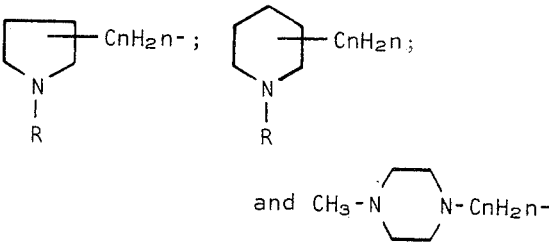

in which n is 2 or 3, inclusive, and R is alkyl defined as above, or $R_2$ is

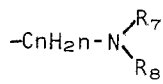

in which n is defined as above, or together

is pyrrolidino or piperidino; and wherein $R_3$ and $R_4$ are hydrogen, fluoro, chloro, bromo, alkyl defined as above, trifluoromethyl and alkylthio of 1 to 3 carbon atoms, inclusive.

The more desirable compounds of this invention are of the formula IIIB:

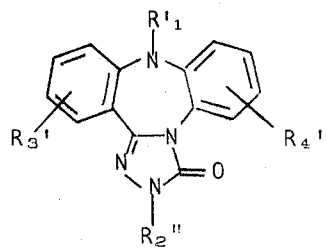

wherein $R_1'$ is hydrogen, alkyl of 1 to 3 carbon atoms, inclusive or

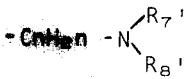

in which $n$ is 2 or 3, and $R_7'$ and $R_8'$ are hydrogen or alkyl defined as above; wherein $R_2''$ is hydrogen, alkyl as defined above,

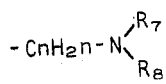

defined as above; or

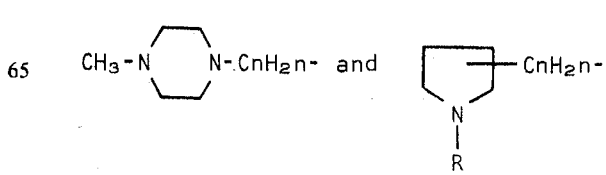

in which n is defined as above, and R is methyl; wherein $R_3'$ and $R_4'$ are hydrogen, fluorine, chlorine, or bromine.

The most desirable compounds of this invention are of the formula IIIC:

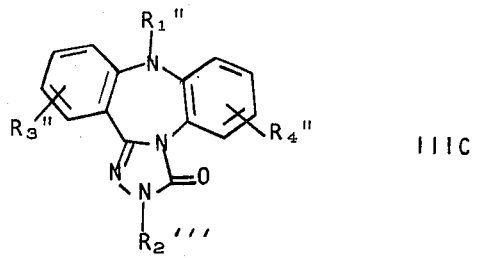

wherein $R_1''$ is hydrogen, alkyl of 1 to 3 carbon atoms, inclusive, or

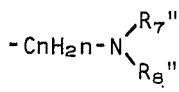

in which n is 2 or 3, and $R_7''$ and $R_8''$ are alkyl defined as above; wherein $R_2'''$ is hydrogen,

 defined as above or

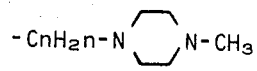

in which $n$ is defined as above; and wherein $R_3''$ and $R_4''$ are hydrogen or chlorine.

The invention also embraces the pharmacologically acceptable acid addition salts of the compounds of formula II and III (including IIIA, IIIB, and IIIC) above.

The process of this invention comprises: heating a thio compound of formula I with an alkyl carbazate to obtain the triazolone compound II and alkylating II with a compound IR formula $ClR_2'$, $BrR_2'$, or $IR_2'$ in which $R_2'$ is defined as above to produce a compound of formula IIIA above.

DESCRIPTION OF THE PREFERRED EMBODIMENT

Lower alkyl groups of 1 to 3 carbon atoms, inclusive, are exemplified by methyl, ethyl, propyl, and isopropyl.

The carbon chain moiety of alkylthio, which is of 1 to 3 carbon atoms, inclusive, can be defined as lower-alkyl of 1 to 3 carbon atoms, inclusive, as above.

The novel compounds of formulae II and III and pharmacologically acceptable acid addition salts thereof have mild tranquilizing, anti-anxiety and anti-depressant activity and are thus useful for the treatment of depression and anxieties in mammals or birds.

Sedatives effects of the compounds of formulae II and III are shown by the following tests in mice:

Chimney test: [Med. Exp. 4, 145 (1961)]: The test determines the ability of mice to back up and out of a vertical glass cylinder within 30 seconds. At the effective dosage, 50% of the mice failed to do so.

Dish test: Mice in Petri dishes (10 cm. diameter, 5 cm. high, partially embedded in wood shavings), climb out in a very short time, when treated. Mice remaining in the dish for more than 3 minutes indicates tranquilization. $ED_{50}$ equals the dose of test compound at which 50% of the mice remain in the dish.

Pedestal test: The untreated mouse leaves the pedestal in less than a minute to climb back to the floor of the standard mouse box. Tranquilized mice will stay on the pedestal for more than 1 minute.

Nicotine antagonism test: Mice in a group of 6 are injected with the test compound. Thirty minutes later the mice are injected with nicotine salicylate (2 mg./1g. ). The control mice show overstimulation, i.e., (1) running convulsions; followed by (2) tonic extensor fits; followed by (3) death.

The following compounds have (by intraperitoneal injection) $ED_{50}$ as shown in the table below. The abbreviations are identified as follows:

CH = chimney test
D = dish test
P = pedestal test
Ni = nicotine antagonism (3) test

TABLE I

| COMPOUND | $ED_{50}$ (in mg./kg.) | | | |
|---|---|---|---|---|
| | CH | D | P | Ni |
| 2-[2-(dimethylamino)ethyl]-2,9-dihydro-3H-dibenzo[b,f]-s-triazolo[4,3-d][1,4]diazepin-3-one (A) | 28 | 8 | 45 | 4 |
| 2-[2-(dimethylaminoethyl)-9-methyl-2,9-dihydro-3H-dibenzo[b,f]-s-triazolo[4,3-d]-[1,4]diazepin-3-one (B) | 22 | 32 | | 16 |
| 2-[3-(dimethylamino)propyl]-2,9-dihydro-3H-dibenzo[b,f]-s-triazolo[4,3-d][1,4]-diazepin-3-one; | 20 | 28 | 40 | 13 |
| 2-[3-(4-methyl-1-piperazinyl)propyl]-2,9-dihydro-3H-dibenzo[b,f]-s-triazolo[4,3-d]-[1,4]diazepin-3-one hemihydrate (D) | 40 | 20 | 63 | 25 |
| 9-[3-(dimethylamino)propyl)]-2,9-dihydro-3H-dibenzo[b,f]-s-triazolo[4,3-d][1,4]-diazepin-3-one (E) | 63 | 71 | | 20 |

Tests for anti-depressant activity were also performed.

The main function of an anti-depressant is to return the depressed individual to normal function. This should be carefully differentiated from psychic stimulants such as the amphetamines which produce overstimulation in the normal individual.

Many different methods have been and are used to evaluate antidepressant activity. In general these methods involve antagonism to a depressant such as reserpine or tetrabenazine or a synergistic increase of the toxicity of certain compounds (i.e. yohimbine or 3,4-dihydroxyphenylalanine) and comparison of the drug action of the new compound with other known antidepressants. No single test alone can determine whether or not a new compound is an antidepressant or not, but the profile evidenced by various tests will establish the anti-depressant action if present. A number of such tests are described below.

Hypothermic tests with oxotremorine: [1-[4-(pyrrolidinyl)-2-butyryl]-2-pyrrolidinone].

Oxotremorine (as well as apomorphine and tetrabenazine) produces hypothermic responses in mice. This response is blocked by anticholinergics and antidepressants such as atropine and imipramine.

Oxotremorine produces a very pronounced hypothermia which reaches a peak 60 minutes after administration.

At 0.6 mg./kg. the body temperature of a mouse is decreased about 13° F. (when the mouse is kept at room temperature). This temperature decrease is antagonized by anti-depressants e.g. desipramine, imipramine, doxepine, and others can be seen from Table II.

Table II
Effect of Various Compounds on Oxotremorine-Induced Hypothermia in Mice

| Compound | Dose mg./kg., I. P. | Absorption Time (min) | Body Temperature °F-Change From Vehicle Control After Minutes | | | |
|---|---|---|---|---|---|---|
| | | | 15 | 30 | 60 | 90 |
| Oxotremorine (Control) | 0.6 | | −5.8 | −11.6 | −13.2 | −8.0 |
| Desipramine | 25 | 30 | −3.5 | −3.5 | −4.1 | −3.6 |
| Imipramine | 25 | 30 | −0.4 | −3.3 | −5.6 | −6.4 |
| Iprindole | 25 | 30 | −6.3 | −11.8 | −12.8 | −11.9 |
| Doxepine | 25 | 30 | −2.3 | −7.1 | −11.0 | −12.3 |
| Amitriptyline | 25 | 30 | +0.7 | −2.4 | −5.4 | −6.8 |
| Amphetamine | 5 | 30 | −1.5 | −4.3 | −4.4 | −2.2 |
| Atropine | 3 | 30 | +0.6 | −0.6 | −0.7 | −0.2 |

The present compounds were tested as follows. Four male mice of 18–22 g. (Strain CF=Carworth Farms) were injected intraperitoneally with 1 mg. of oxotremorine. The lowering of the body temperature was measured rectally with an electronic thermometer, before and 30 minutes after drug administration. After the drug administration the mice were kept at 19° C. in cages. A four degree (F) increase in the body temperature of the treated mouse (oxotremorine and test compound) over the untreated mouse (oxotremorein alone) indicates anti-depressive activity.

The results are tabulated below:

TABLE III

| | Active at mg./kg. |
|---|---|
| oxotremorine (1 mg.) and A | 4.4 |
| oxotremorine (1 mg.) and B | 4.3 |
| oxotremorine (1 mg.) and C | 50 |
| oxotremorine (1 mg.) and D | 100 |
| oxotremorine (1 mg.) and E | 1.9 |

Potentiation of yohimbine aggregation toxicity: the $LD_{50}$ of yohibine hydrochloride in mice is 45 mg./kg. i.p. Administration of 30 mg./kg. of yohimbine hydrochloride was non-lethal. If an antidepressant is administered prior to the yohimbine hydrochloride (30 mg.) the lethality of the yohimbine hydrochloride is increased.

Ten male CF mice, 18–22 g., were injected with yohimbine hydrochloride in saline solution. After two hours the $LD_{50}$ are determined. Groups of ten mice are injected with the antidepressant 30 minutes before the administration of yohimbine hydrochloride [YCl] (30 mg.). No mice or only one mouse is killed from 30 mg. of [YCl]. If [YCl] is administered in the presence of an anti-depressant an increase in the toxicity of [YCl] is found. The $ED_{50}$ value of the five compounds A, B, C, D, and E in causing 50% of the mice to die is shown in Table IV:

TABLE IV

| | $ED_{50}$ mg./kg. |
|---|---|
| [YCl] (30 mg.) control | no deaths |
| [YCl] (30 mg.) and A | 21 mg. |
| [YCl] (30 mg.) and B | 7 mg. |
| [YCl] (30 mg.) and C | >50 mg. |
| [YCl] (30 mg.) and D | 35 mg. |
| [YCl] (30 mg.) and E | 12.5 mg. |

Potentiation of apomorphine gnawing: a group of 4 mice (male, CF, 18–22 g.) are administered the test compound intraperitoneally one hour prior to the subcutaneous injection of apomorphine hydrochloride 10 mg./kg. The mice are then placed in a plastic box (6 × 11 × 5 inches) lined at the bottom with a cellophane-backed, absorbent paper. The degree of damage to the paper at the end of 30 min. is scored from zero to 4. The scores 3 and 4 indicate that the compound is a potentiator of apomorphine in this test. Compounds A, B, D, and E were positive in this test at 100 mg./kg. and less in mice.

Thus, the above results show that compounds of formulae II and III (IIIA, IIIB, and IIIC included) and the pharmacologically acceptable acid addition salts can be used as antidepressants in mammals to achieve normalcy in the depressed individual.

The pharmaceutical forms of compounds of formula III and salts thereof contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates, lactose, proteins, lipids, calcium phosphate, cornstarch, stearic acid, methylcellulose and the like may be used as carriers or for coating purposes. Water or oils, such as coconut oil, sesame oil, safflower oil, cottonseed oil, and peanut oil, may be used for preparing solutions or suspensions of the active drug. Sweetening, coloring and flavoring agents may be added.

For mammals food premixes with starch, oatmeal, dried fishmeat, fishmeal, flour, and the like can be prepared.

As anxiety relieving compounds and as antidepressants the compounds of formulae II and III (IIIA, IIIB, and IIIC included) and their pharmacologically acceptable acid addition salts can be used in dosages of 0.5–25 mg./kg., with 1–10 mg./kg. preferred in oral or injectable preparations as described above to alleviate anxieties and depression occurring in stressful situations. Such situations are those for example, when animals are traveling, changing ownerships or are temporarily put into kennels, while their owners are absent from home. In larger animals, 5 kg. and more, the low dosage ranges are preferable.

Acid addition salts of the compounds of formulae II and III can be made, such as the fluosilicic acid addition salts which can be applied as mothproofing agents. In particular, salts with trichloroacetic acid are useful as herbicides against Johnson grass, Bermuda grass, yellow and red foxtail, and quack grass.

The starting materials of this invention are dihydrodibenzodiazepinethiones I which are either known or can be synthesized, for simplicity by treating the corresponding oxo compounds [Hunziker et al. Arzneimittel Forschung 13, 324 (1964); Coyne et al., J. Org. Chem. 10, 541 (1967)] with phosphorus pentasulfide as further illustrated by the preparations.

In carrying out the process of this invention, a selected thione I, is heated with an alkyl carbazate of the formula:

$$H_2N-NH-COOAlk$$

in which the alkyl group is of 1 to 3 carbon atoms, inclusive. Usually ethyl carbazate is preferred, but higher alkyl carbazates are operative. In the preferred embodiment of this invention, the selected thione I is heated with ethyl carbazate in large excess for ½ hour to 3 hours at 190° to 250°C. in an oil bath. The alkyl carbazate serves simultaneously as reagent and solvent. The product usually precipitates upon cooling of the reaction mixture and is recovered by filtration and purified by conventional means, e.g., extractions of impurities, chromatography or most commonly by recrystallization. The triazolone compound II is thus, obtained.

Alkylation of II is achieved by reacting the product II with a strong base e.g., sodium or potassium hydride in an organic solvent, e.g., dimethylformamide, diethylformamide, diethylacetamide, tetrahydrofuran, dioxane, benzene or the like with an excess of the base, followed by reacting the alkali metal salt thus formed with $R_2'X$ in which X is chlorine, bromine, or iodine and $R_2'$ is defined as above. Both reactions, formation of salt and the reaction of this salt with $R_2'X$, are usually performed at elevated temperatures between 50° and 125°C. The conversion of II to its alkali salt is usually performed during 15–75 minutes. The reaction of the salt with the chloride is carried out during a longer period of time by keeping the reaction mixture at the elevated temperature for 1 to 36 hours. The product III, thus obtained, is isolated and purified by conventional means, e.g., extraction, chromatography, crystallization and the like.

The following preparations and examples are illustrative of the processes and products of the present invention, but are not to be construed as limiting.

PREPARATION 1

5,10-Dihydro-11H-dibenzo[b,e][1,4]diazepin-11-thione

A mixture of 5,10-dihydro-11H-dibenzo[b,e][1,4]diazepin-11-one (10 g., 0.0476 mole), phosphorus pentasulfide (9.3 g., 0.0525 mole) and 365 ml. of pyridine is heated at reflux temperature for 3 hours and allowed to stand overnight. The pyridine is evaporated, and the residue is shaken with 250 ml. each of water and chloroform. The resulting suspension is filtered to remove solid product. After filtration the chloroform layer is separated from the aqueous layer, washed with water and saturated salt solution, dried over anhydrous magnesium sulfate and evaporated. The residue is combined with the solid obtained above and crystallized from methanol. Two crops of 5,10-dihydro-11H-dibenzo[b,e][1,4]diazepin-11-thione are obtained; yield, 9.01 g. (84% of theory), melting point 257°–259°C.

PREPARATION 2

7-Chloro-5,10-dihydro-11H-dibenzo[b,e]-[1,4]diazepine-11-thione

A mixture of 7-chloro-5,10-dihydro-11H-dibenzo[b,e]-[1,4]diazepin-11-one (30.5 g., 0.125 mole), phosphorus pentasulfide (27.8 g., 0.131 mole) and one l. of pyridine is heated at reflux temperature for 4 hours and the pyridine is evaporated in vacuo. The residue is stirred for 1 hours with one liter each of saturated aqueous sodium bicarbonate and methylene chloride and filtered to remove some solid product. The organic layer of the filtrate is washed successively with sodium bicarbonate solution and with saturated salt solution, dried over anhydrous magnesium sulfate and evaporated. The residue is combined with the solid obtained above and triturated with hot chloroform and methanol; 12.2 g. of 7-chloro-5,10-dihydro-11H-dibenzo[b,e]-[1,4]diazepine-11-thione is obtained of melting point 274°–275°C. Concentration of the chloroform-methanol washings affords an additional 8.4 g. of product having the same melting point. Recrystallization from dimethylformamide-water gives an analytical sample in the form of pale yellow needles of melting point 276°–277°C.

PREPARATION 3

5,10-Dihydro-5-methyl-11H-dibenzo[b,e][1,4]-diazepine-11-thione

A mixture of 5,10-dihydro-5-methyl-11H-dibenzo[b,e]-[1,4]diazepin-11-one (6.1 g., 0.0272 mole), phosphorus pentasulfide (6.51 g., 0.0286 mole) and 175 ml. of pyridine was heated at reflux temperature for 3.75 hours and the pyridine was then evaporated in vacuo. The residue was shaken with chloroform and saturated aqueous sodium bicarbonate. The resulting suspension was filtered to give solid A. The chloroform layer of the filtrate was washed successively with saturated aqueous sodium bicarbonate and with saturated salt solution, dried over anhydrous magnesium sulfate and evaporated. The residue was crystallized from methylene chloride-methanol to give 3.5 g. of 5,10-dihydro5-methyl-11H-dibenzo[b,e][1,4]diazepin-11-thione of melting point 217°–218°C., which was unchanged after recrystallization. A second crop weighed 0.8 g. and melted at 214°–215°C.

Solid A was shaken with methylene chloride and 10% sodium hydroxide and processed as above to give an additional 1.5 g. of the thione, melting point 216°–217°C.

Anal. calcd. for $C_{14}H_{12}N_2S$: C, 69.96; H, 5.30; N, 11.66; S, 13.34; N, 11.66.

Found: C, 69.79; H, 5.20; N, 11.37; S, 13.29.

PREPARATION 4

5-[3-(diethylamino)propyl]-5,10-dihydro-11-dibenzo[b,e][1,4]diazepin-11-thione

A. Methyl N-[3-(diethylamino)propyl]-N-(o-nitrophenyl) authranilate

A solution of N-(o-nitrophenyl)anthranilate in dimethylsulfoxide under nitrogen is reacted with sodium hydride (52% in oil suspension) at room temperature (23°–26°C.) for 1 hour. Then 3-(diethylamino)propyl chloride is added, the mixture stirred at room temperature for 20 hours, and poured in excess ice-water. The solids are recrystallized to give N-[3-(diethylamino)propyl]-N-(o-nitrophenyl)anthranilate.

B. 5-[3-(diethylamino)propyl]-5,10-dihydro-11H-dibenzo-[b,e][1,4]diazepin-11-one A solution of methyl N-[3-(diethylamino)propyl]-N-(o-nitrophenyl)anthranilate in methanol is hydrogenated (about 3 atm. pressure) in the presence of Raney nickel. The crude amino product thus obtained, is isolated by filtration, redissolved in 80% ethanol–20% water and potassium hydroxide. This mixture is refluxed for 1 hour, evaporated in vacuo, the residue redissolved in water with 10% aqueous hydrochloric acid (the mixture adjusted to pH 6).

The solid obtained after cooling is recovered by filtration and recrystallized from ethanol to give 5-[3-(diethylamino)propyl]-5,10-dihydro-11H-dibenzo[b,e][1,4]-diazepin-11-one.

C. 5-[3-(diethylamino)propyl]-5,10-dihydro-11H-dibenzo-[b,e][1,4]diazepin-11-thione A mixture of 5-[3-(diethylamino)propyl]-5,10-dihydro-11H-dibenzo[b,e][1,4]diazepin-11-one, phosphorus pentasulfide and pyridine is refluxed for 4 hours, then evaporated in vacuo. The residue is dissolved in chloroform, filtered, the filtrate washed with aqueous sodium bicarbonate, brine, water, and finally dried over anhydrous magnesium sulfate and evaporated. The resulting residue is recrystallized from methylene dichloride-methanol to give 5-[3-(diethylamino)propyl]-5,10-dihydro-11H-dibenzo[b,e][1,4]diazepin-11-thione.

In the same manner given in Preparation 4, other 5-alkyl substituted-5,10-dihydro-11H-dibenzo[b,e][1,4]diazepin-11-thione compounds are prepared by reacting a lower alkyl N-(o-nitrophenyl)anthranilate with sodium hydride or a sodium alkoxide followed by a selected alkyl bromide or iodide and proceeding with the reduction, ring closure and conversion to the thione as shown in parts B and C of Preparation 4.

Starting compounds of formula I, thus produced include 2,8-dichloro-5,10-dihydro-11H-dibenzo[b,e][1,4]diazepine-11-thione;

5-methyl-5,10-dihydro-11H-dibenzo[b,e][1,4]diazepine-11-thione;

2,8-dibromo-5,10-dihydro-11H-dibenzo[b,e][1,4]diazepine-11-thione;

5-[2-(dimethylamino)ethyl]-5,10-dihydro-11H-dibenzo[b,e]-[1,4]diazepine-11-thione;

3,7-difluoro-5,10-dihydro-11H-dibenzo[b,e][1,4]diazepine-11-thione;

2,7-difluoro-5,10-dihydro-11H-dibenzo[b,e][1,4]diazepine-11-thione;

3,8-difluoro-5,10-dihydro-11H-dibenzo[b,e][1,4]diazepine-11-thione;

5-[2-(diethylamino)ethyl]-5,10-dihydro-11H-dibenzo[b,e]-[1,4]diazepine-11-thione;

2,8-dimethylthio-5,10-dihydro-11H-dibenzo[b,e][1,4]diazepine-11-thione;

5-ethyl-5,10-dihydro-8-methyl-11H-dibenzo[b,e][1,4]diazepine-11-thione;

5-propyl-5,10-dihydro-11H-dibenzo[b,e][1,4]diazepine-11-thione;

5,10-dihydro-11-methyl-5-[2-(4-piperazin-1-yl)ethyl]-11H-dibenzo[b,e][1,4]diazepine-11-thione;

1-bromo-2-5-[3-(N-methylpyrrolidin-3-yl)propyl]-5,10-dihydro-11H-dibenzo[b,e][1,4]diazepine-11-thione;

5,10-dihydro-11-(isopropylthio)-11H-dibenzo[b,e][1,4]diazepine-11-thione;

5-[2-(propylamino)ethyl]-8-fluoro-5,10-dihydro-11H-dibenzo[b,e][1,4]diazepine-11-thione;

7-7,10-dihydro-3-propoxy-11H-dibenzo[b,e][1,4]diazepine-11-thione;

and the like.

EXAMPLE 1

2,9-Dihydro-3H-dibenzo[b,f]-s-triazolo[4,3-d]-[1,4]diazepin-3-one

A mixture of 5,10-dihydro-11H-dibenzo[b,e][1,4]diazepin-11-thione (21 g., 0.093 mole) and 100 g. of ethyl carbazate is heated for 50 minutes at 190°–200°C. in an oil bath preheated to that temperature using a take-off condenser. During this time 25 ml. of liquid is removed. The mixture is cooled to 50°C. and 100 ml. of water is added. The resulting suspension is filtered and the solid is washed with water and ether. The 2,9-dihydro-3H-dibenzo[b,f]-s-triazolo[4,3-d][1,4]diazepin-3-one thus obtained weighs 15.4 g. (66% yield) which melts at 262°–263.5°C. After recrystallization from acetone-water; the melting point was 263°–264.5°C.

Anal. calcd. for $C_{14}H_{10}N_4O$: C, 67.19; H, 4.03; N, 22.39.

Found: C, 66.79; H, 3.96; N, 22.43.

EXAMPLE 2

2-[2-(Dimethylamino)ethyl]-2,9-dihydro-3H-dibenzo[b,f]-s-triazolo[4,3-d][1,4]diazepine-3-one Sodium hydride (0.456 g., 0.0108 mole of a 57% dispersion in mineral oil) is added to a solution of 2,9-dihydro-3H-dibenzo[b,f]-s-triazolo[4,3-d][1,4]diazepin-3-one (2.7 g., 0.0108 mole) in 95 ml. of dimethylformamide and the mixture is heated at 95°C. for 30 minutes. The mixture is cooled to 40°C. and a solution of 2-dimethylaminoethyl chloride (1.16 g.; 0.0108 mole in 1.16 g. of xylene) is added. The mixture is heated at 95°C. for 18 hours and evaporated. Water and methylene chloride are added, the organic layer is separated and extracted three times with 20 ml. portions of 10% aqueous hydrochloric acid. The acid extract is washed with ether and the ether is discarded. The extract is cooled, made alkaline with 15% aqueous sodium hydroxide and extracted with methylene chloride. The extract is washed with water and with saturated salt solution, dried over anhydrous magnesium sulfate and evaporated. The residue is crystallized from ether to give 1.83 g. of small, tan prisms of 2-[2-(dimethylamino)ethyl]-2,9-dihydro-3H-dibenzo[b,f]-s-triazolo[4,3-d][1,4]diazepin-3-one of melting point 143°–144.5°C. After recrystallization the melting point is 144°–145°C.

Anal. calcd. for $C_{18}H_{19}N_5O$: C, 67.27; H, 5.96; N, 21.79.

Found: C, 67.25; H, 6.10; N, 21.44.

EXAMPLE 3

2-[3-(Dimethylamino)propyl]-2,9-dihydro-3H-dibenzo[b,f]-s-triazolo[4,3-d][1,4]diazepin-3-one Sodium hydride (0.456 g., 0.0108 mole of 57% dispersion in mineral oil) is added to a solution of 2,9-dihydro-3H-dibenzo[b,f]-s-triazolo[4,3-d][1,4]diazepin-3-one (2.7 g., 0.0108 mole) in 95 ml. of dimethylformamide. The mixture is stirred at room temperature for 30 minutes and then heated at 95°C. for 30 minutes. The mixture is cooled to 40°C., a solution of 3-dimethylaminopropyl chloride (1.31 g., 0.0108 mole in 1.31 g. of xylene) is added and heating at 95°C. was continued for 21 hours. The mixture is concentrated by distillation and water and methylene chloride are added to the concentrate. The organic layer is separated and extracted three times with 20 ml. portions of 10% aqueous hydrochloric acid. The acid extract is washed with ether (which was discarded) made alkaline with 15% aqueous sodium hydroxide and the basic mixture is extracted with methylene chloride. The extract is washed with saturated salt solution, dried over anhydrous magnesium sulfate and evaporated. The residue is crystallized from ether to give 2.54 g. of 2-[3-(dimethylamino)propyl]-2,9-dihydro-3H-dibenzo[b,f]-s-triazolo[4,3-d][1,4]diazepin-3-one of melting point 125°–126°C.

Anal. calcd. for $C_{19}H_{12}N_5O$: C, 68.08; H, 6.31; N, 20.88.

Found: C, 68.20; H, 6.42; N, 20.73.

EXAMPLE 4

2,9-Dihydro-2-[3-(4-methyl-1-piperazinyl)propyl]-3H-dibenzo[b,f]-s-triazolo[4,3-d][1,4]diazepin-3-one and its dihydrochloride Sodium hydride (0.456 g., 0.108 mole of a 57% dispersion in mineral oil) is added to a solution of 2,9-dihydro-3H-dibenzo[b,f]-s-triazolo[4,3-d][1,4]diazepin-3-one (2.7 g., 0.108 mole) in 95 ml. of dimethylformamide and the mixture is heated at 95°C. for 30 minutes. The mixture is coold to 40°C., a solution of 1-(3-chloropropyl)-4-methylpiperazine (1.9 g., 0.0108 mole in 1.9 g.; of xylene) is added and heating at 95°C. is continued for 22 hours. The mixture is evaporated. The thus-obtained residue is dissolved in methylene chloride and water. The organic layer is separated and extracted three times with 10 ml. portions of 10% aqueous hydrochloric acid. The acid extract is washed with ether (which was discarded), cooled, made alkaline with 15% aqueous sodium hydroxide and the basic mixture is extracted with methylene chloride. The extract is washed with water and with saturated salt solution, dried over anhydrous magnesium sulfate and evaporated to dryness. The 2,9-dihydro-2-[3-(4-methyl-1-piperazinyl)propyl]-3H-dibenzo[b,f]-s-triazolo[4,3-d][1,4]diazepin-3-one thus obtained is dissolved in 30 ml. of methanol and added to 100 ml. of 1.1 N etheral hydrogen chloride. The gum which separates is triturated with hot methanol, yielding 2.4 g. of 2,9-dihydro-2-[3-(4-methyl-1-piperazinyl)propyl]-3H-dibenzo[b,f]-s-triazolo[4,3-d][1,4]diazepin-3-one dihydrochloride of melting point 288°–290°C. After crystallization from methanol-methylene chloride the product melts at 286°–288°C.

Anal. calcd. for $C_{22}H_{27}N_6O \cdot 2HCl$: C, 57.02; H, 6.09; Cl, 15.30; N, 18.14.

Found: C, 56.99; H, 6.25; Cl, 15.08; N, 18.44.

EXAMPLE 5

5-(3-Dimethylaminopropyl)-5,10-dihydro-11H-dibenzo[b,e][1,4]diazepin-11-thione

A mixture of 5-(3-dimethylaminopropyl)-5,10-dihydro-11H-dibenzo[b,e][1,4]diazepin-11-one (5 g., 0.017 mole), phosphorus pentasulfide (4.15 g., 0.0187 mole) and 175 ml. of pyridine is heated at reflux temperature for 3 hours and the pyridine is then evaporated. The residue is dissolved in 150 ml. of methylene chloride and 100 ml. of 5% aqueous hydrochloric acid. The organic layer is separated and washed with water and with saturated salt solution, dried over anhydrous magnesium sulfate and evaporated. Crystallization of the residue from methanol gives a first crop of 4.08 g. of 5-[3-(dimethylamino)propyl]-5,10-dihydro-11H-dibenzo[b,e][1,4]diazepin-11-thione melting at 181°–182°C. and a second crop of 0.257 g. melting at 179°–180°C.; yield 85%.

Anal. calcd. for $C_{18}H_{21}N_3S$: C, 69.41; H, 6.80; N, 13.49; S, 10.30.

Found: C, 69.61; H, 6.63; N, 13.18; S, 10.33.

EXAMPLE 6

9-[3-(Dimethylamino)propyl]-2,9-dihydro-3H-dibenzo[b,f]-s-triazolo[4,3-d][1,4]diazepin-3-one A mixture of 5-(3-(dimethylamino)propyl]dibenzo[b,e][1,4]diazepin-11-thione, (0.5 g., 1.6 mmoles) and ethyl carbazate (1.66 g., 16 mmoles) is immersed in an oil bath at 192° for 10 minutes, removed and allowed to stand at room temperature for about 72 hours. Water and methylene chloride are added to the mixture and the aqueous layer is separated and extracted five times with 10 ml. portions of methylene chloride. The extract is washed thrice with water and once with saturated salt solution, dried over anhydrous magnesium sulfate and evaporated. The residue is triturated with acetone and then crystallized from acetone to give 0.225 g. of 9-[3-(dimethylamino)propyl]-2,9-dihydro-3H-dibenzo[b,f]-s-triazolo[4,3-d][1,4]diazepin-3-one as prisms melting at 212°–214°C. After recrystallization the product melted at 213°–214°C.

Anal. calcd. for $C_{19}H_{21}N_5O$: C, 68.04; H, 6.31; N, 20.88.

Found: C, 67.95; H, 6.34; N, 20.64.

EXAMPLE 7

6,12-Dichloro-2,9-dihydro-3H-dibenzo[c,f]-s-triazolo[4,3-d][1,4]diazepin-3-one

In the manner given in Example 5, 2,8-dichloro-5,10-dihydro-11-dibenzo[b,e][1,4]diazepin-11-thione and ethyl carbazate gives 6,12-dichloro-2,9-dihydro-3H-dibenzo[b,f]-s-triazolo[4,3-d][1,4]diazepin-3-one.

EXAMPLE 8

6,12-Dichloro-2,9-dihydro-2-[2-(dimethylamino)ethyl]-3H-dibenzo[b,f]-s-triazolo[4,3-d][1,4]diazepin-3-one In the manner given in Example 2, 6,12-dichloro-2,9-dihydro-3H-dibenzo[b,f]-s-triazolo[4,3-d][1,4]diazepin-3-one is treated with sodium hydride, and subsequently with 1-(2-chloroethyl)morpholine to give 6,12-dichloro-2,9-dihydro-2-(2-morpholinoethyl)-3H-dibenzo[b,f]-s-triazolo[4,3-d][1,4]diazepin-3-one.

EXAMPLE 9

7,11-Difluoro-2,9-dihydro-3H-dibenzo[b,f]-s-triazolo[4,3-d][1,4]diazepin-3-one

In the manner given in Example 1, 3,7-difluoro-5,10-dihydro-11H-dibenzo[b,e][1,4]diazepin-11thione and ethyl carbazate gives 7,11-difluoro-2,9-dihydro-3H-dibenzo-[b,f]-s-triazolo[4,3-d][1,4]diazepin-3-one.

EXAMPLE 10

7,11-Difluoro-2,9-dihydro-2-isopropyl-3H-dibenzo[b,f]-s-triazolo[4,3-d][1,4]diazepin-3-one In the manner given in Example 2, 7,11-difluoro-2,9-dihydro-3H-dibenzo[b,f]-s-triazolo[4,3- d][1,4]diazepin-3-one is treated with sodium hydride and subsequently with isopropyl chloride to give 7,11-difluoro-2,9-dihydro-2-isopropyl-3H-dibenzo[b,f]-s-triazolo[4,3-d][1,4]diazepin-3-one.

EXAMPLE 11

9-Propyl-2,9-dihydro-10-methyl-3H-dibenzo-[b,f]-s-triazolo[4,3-d][1,4]diazepin-3-one In the manner given in Example 1, 9-propyl-5,10-dihydro-4-methyl-11H-dibenzo[b,e][1,4]diazepin-11-thione and ethyl carbazate gives 9-propyl-2,9-10-methyl-2,9-dihydro-3H-dibenzo[b,f]-s-triazolo[4,3-d][1,4]diazepin-3-one.

EXAMPLE 12

9-Propyl-2,9-dihydro-10-methyl-2-[3-(1-pyrrolidinyl)propyl]-3H-dibenzo[b,f]-s-triazolo[4,3-d][1,4]diazepin-3-one In the manner given in Example 2, 9-propyl-2,9-dihydro-10-methyl-3H-dibenzo[b,f]-s-triazolo[4,3-d][1,4]diazepin-3-one is treated with sodium hydride and subsequently with 1-(3-chloropropyl)pyrrolidine to give 9-propyl-2,9-dihydro-10-methyl-2-[3-(1-pyrrolidinyl)propyl]-3H-dibenzo-[b,f]-s-triazolo[4,3-d][1,4]diazepin-3-one.

EXAMPLE 13

8-Bromo-2,9-dihydro-3H-dibenzo[b,f]-s-triazolo-[4,3-d][1,4]diazepin-3-one

In the manner given in Example 5, 6-bromo-5,10-dihydro-11H-dibenzo[b,e][1,4]diazepin-11-thione and ethyl carbazate gives 8-bromo-2,9-dihydro-3H-dibenzo[b,f]-s-triazolo-[4,3-d][1,4]diazepin-3-one.

EXAMPLE 14

8-Bromo-2-[3-(dipropylamino)propyl]-12-(ethylthio sulfinyl)-2,9-dihydro-3H-dibenzo[b,f]-s-triazolo[4,3-d]-[1,4]diazepin-3-one In the manner given in Example 6, 8-bromo-12-(ethylthio)-2,9-dihydro-3H-dibenzo[b,f]-s-triazolo[4,3-d][1,4]-diazepin-3-one is treated with potassium hydride and subsequently with 3-(dipropylamino)propyl chloride to give 8-bromo-2-[3-(dipropylamino)propyl]-12-(ethylthio)-2,9-dihydro-3H-dibenzo[b,f]-s-triazolo[4,3-d][1,4]diazepin-3-one.

EXAMPLE 15

2,9-Dihydro-10-isopropyl-3H-dibenzo[b,f]-s-triazolo[4,3-d][1,4]diazepin-3-one

In the manner given in Example 5, 5,10-dihydro-4-isopropyl-11H-dibenzo[b,e][1,4]diazepin-11-thione and ethyl carbazate gives 2,9-dihydro-10-isopropyl-3H-dibenzo[b,f]-s-triazolo[4,3-d][1,4]diazepin-3-one.

EXAMPLE 16

2-[2-(Diethylamino)ethyl]-2,9-dihydro-10-isopropyl-3H-dibenzo[b,f]-s-triazolo[4,3-d][1,4]diazepin-3-one In the manner given in Example 2, 2,9-dihydro-10-isopropyl-3H-dibenzo[b,f]-s-triazolo[4,3-d][1,4]diazepin-3-one is treated with sodium hydride and subsequently with 2-(diethylamino)-1-chloroethane to give 2-[2-(diethylamino)-ethyl]-2,9-dihydro-10-isopropyl-3H-dibenzo-[b,f]-s-triazolo-[4,3-d][1,4]diazepin-3-one.

EXAMPLE 17

6,12-Dichloro-9-[3-(dimethylamino)propyl]-2,9-dihydro-3H-dibenzo[b,f]-s-triazolo[4,3-d][1,4]diazepin-3-one In the manner given in Example 1, 2,8-dichloro-5-[3-(dimethylamino)propyl]-5,10-dihydro-11-dibenzo[b,f][1,4]-diazepin-11-thione and ethyl carbazate gives 6,12-dichloro-9-[3-(dimethylamino)propyl]-2,9-dihydro-3H-dibenzo[b,f]-s-triazolo[4,3-d][1,4]diazepin-3-one.

EXAMPLE 18

6,12-Dichloro-2-[3-(diethylamino)propyl]-9-[3-(dimethylamino)propyl]-2,9-dihydro-3H-dibenzo[b,f]-s-triazolo[4,3-d][1,4]diazepin-3-one In the manner given in Example 2, 6,12-dichloro-9-[3-(dimethylamino)propyl]-2,9-dihydro-3H-dibenzo[b,f]-s-triazolo[4,3-d][1,4]diazepin-3-one is treated with sodium hydride and subsequently with 3-(diethylamino)propyl chloride to give 6,12-dichloro-2-[3-(diethylamino)propyl]-9-[3-(dimethylamino)propyl]-2,9-dihydro-3H-dibenzo[b,f]-s-triazolo[4,3-d][1,4]diazepin-3-one.

EXAMPLE 19

2,9-Dihydro-9-methyl-3H-dibenzo[b,f]-s-triazolo[4,3-d][1,4]diazepin-3-one

A mixture of 5,10-dihydro-5-methyl-11H-dibenzo[b,e]-[1,4]diazepin-11-one (1 g., 4.16 mmole) and ethyl carbazate (4.31 g., 4.16 mmole) was immersed for 30 minutes at 221°–225°C. in an oil bath and the product was processed as described in Example 1. Crystallization from methanol gave 0.85 g. of 2,9-dihydro-9-methyl-3H-dibenzo-[b,f]-s-triazolo[4,3-d][1,4]diazepin-3-one of melting point 159°C.

Anal. calcd. for $C_{15}H_{12}N_4O$: C, 68.17; H, 4.58; N, 21.20.
Found: C, 67.95; H, 4.66; N, 21.00.

EXAMPLE 20

2-[2-(Dimethylamino)ethyl]-2,9-dihydro-9-methyl-3H-dibenzo[b,f]-s-triazolo[4,3-d][1,4]diazepin-3-one and its hydrochloride Sodium hydride (0.169 g., 4 mmoles of a 57% dispersion in mineral oil) is added to a solution of 2,9-dihydro-9-methyl-3H-dibenzo[b,f]-s-triazolo[4,3-d][1,4]diazepin-3-one (1.09 g., 4 mmoles) in 35 ml. of dimethylformamide and the mixture is heated at 95°C. for 35 minutes. The mixture is then cooled to about 40°C. A solution of 2-dimethylaminoethyl chloride (0.428 g., 4 mmoles in 0.428 g. of xylene) is added and heating at 95°C. is continued for 18 hours and then evaporated to dryness in vacuo to give 2-[2-(dimethylamino)ethyl]-2,9-dihydro-9-methyl-3H-dibenzo[b,f]-s-triazolo[4,3-d][1,4]diazepin-3-one. Ether and water are added to the thus obtained residue. The organic layer is extracted three times with 10 ml. portions of 10% aqueous sodium hydroxide and the base mixture extracted with methylene chloride. The extract is washed with water and saturated salt solution, dried over anhydrous magnesium sulfate and evaporated to dryness. The hydrochloride of the base is prepared in ether with ethereal hydrogen chloride and is crystallized from methanol ether to give 0.518 g. of 2-[2-(dimethylamino)ethyl]-2,9-dihydro-9-methyl-3H- dibenzo[b,f]-s-triazolo[4,3-d][1,4]diazepin-3-one hydrochloride of melting point 293°–294°C.

Anal. calcd. for $C_{19}H_{21}N_4O \cdot HCl$: C, 61.36; H, 5.96; Cl, 9.53; N, 18.84.

Found: C, 61.20; H, 5.93; Cl, 9.52; N, 18.30.

EXAMPLE 21

6-Chloro-2,9-dihydro-2-[2-(piperidino)ethyl]-3H-dibenzo[c,f]-triazolo[4,3-a]diazepin-3-one In the manner given in Example 2, 6-chloro-2,9-dihydro-3H-dibenzo[c,f]-s-triazolo[4,3-a]azepin-3-one, sodium hydride and piperidinoethyl chloride gives 6-chloro-2,9-dihydro-2-(2-piperidinoethyl)-3H-dibenzo[c,f]-s-triazolo[4,3-a]-diazepin-3-one.

EXAMPLE 22

7-Chloro-2-[2-(dimethylamino)ethyl]-2,9-dihydro-3H-dibenzo[c,f]-s-triazolo[4,3-d][1,4]diazepin-3-one hydrochloride In the manner given in Example 4, 7-chloro-2,9-dihydro-3H-dibenzo[c,f]-s-triazolo[4,3-d]diazepin-3-one, prepared like in Example 1 from 7-chloro-5,10-dihydro-11H-dibenzo[b,e][1,4]diazepin-11-thione (m.p. 289°–290°) sodium hydride and thereafter 2-(dimethylamino)ethyl chloride gives after extraction with hydrochloric acid 7-chloro-2-[2-(dimethylamino)ethyl]-2,9-dihydro-3H-dibenzo[c,f]-s-triazolo[4,3]diazepin-3-one hydrochloride of melting point 263°–264°C.

EXAMPLE 23

2-[2-(Phthalimido)ethyl]-2,9-dihydro-3H-dibenzo[b,f]-s-triazolo[4,3-d][1,4]diazepin-3-one In the manner given in Example 2, 2,9-dihydro-3H-dibenzo[b,f]-s-triazolo[4,3-d][1,4]diazepin-3-one is first reacted with sodium hydride, and the resulting product with N-(2-bromoethyl)phthalimide to give 2-[2-(phthalimido)-ethyl-2,9-dihydro-3H-dibenzo[b,f]-s-triazolo[4,3-d][1,4]-diazepin-3-one.

EXAMPLE 24

2-[2-(Amino)ethyl]-2,9-dihydro-3H-dibenzo[b,f]-s-triazolo[4,3-d][1,4]diazepin-3-one A mixture of 2-[2-(phthalimido)ethyl]-2,9-dihydro-3H-dibenzo[b,f]-s-triazolo[4,3-d][1,4]diazepin-3-one (4.47 mmole), hydrazine hydrate (0.0179 mole) and 25 ml. of ethanol was stirred at room temperature for 24 hrs. The resulting suspension was filtered, and the filtrate evaporated. The residue was dissolved in methylene chloride and water, the organic layer was washed with water, dried ($MgSO_4$) and evaporated to give 2-[2-(amino)ethyl]-2,9-dihydro-3H-dibenzo[b,f]-s-triazolo[4,3-d][1,4]diazepin-3-one.

EXAMPLE 25

2-[2-(Benzylmethylamino)ethyl]-2,9-dihydro-3H-dibenzo[b,f]-s-triazolo[4,3-d][1,4]diazepin-3-one In the manner given in Example 2, 2,9-dihydro-3H-dibenzo[b,f]-s-triazolo[4,3-d][1,4]diazepin-3-one is first reacted with sodium hydride and the resulting product with N-benzyl-N-methyl-2-chloroethylamine to give 2-[2-(benzylmethylamino)ethyl]-2,9-dihydro-3H-dibenzo[b,f]-s-triazolo-[4,3-d][1,4]diazepin-3-one.

EXAMPLE 26

2-[2-(Methylamino)ethyl]-2,9-dihydro-3H-dibenzo[b,f]-s-triazolo[4,3-d][1,4]diazepin-3-one A mixture of 2-[2-(benzylmethylamino)ethyl]-2,9-dihydro-3H-dibenzo[b,f]-s-triazolo[4,3-d][1,4]diazepin-3-one (0.0367 mole), 1.1 g. of 10% palladium on carbon, 74 ml. of 1N ethereal hydrogen chloride (0.0734 mole) and 240 ml. of methanol was hydrogenated on the Parr at 50 p.s.i. until absorption of hydrogen was complete. The mixture was filtered and the filtrate evaporated to give 2-[2-(methylamino)ethyl]-2,9-dihydro-3H-dibenzo[b,f]-s-triazolo[4,3-d]-[1,4]diazepin-3-one.

EXAMPLE 27

2-[2-(Phthalimido)ethyl]-2,9-dihydro-9-methyl-3H-dibenzo[b,f]-s-triazolo[4,3-d][1,4]diazepin-3-one In the manner given in Example 25, 2,9-dihydro-9-methyl-3H-dibenzo[b,f]-s-triazolo[4,3-d][1,4]diazepin-3-one is first reacted with sodium hydride, and the resulting product with N-(2-bromoethyl)phthalimide to give 2-[2-(phthalimido)ethyl]-2,9-dihydro-9-methyl-3H-dibenzo[b,f]-s-triazolo[4,3-d][1,4]diazepin-3-one.

EXAMPLE 28

2-[2-(Amino)ethyl]-2,9-dihydro-9-methyl-3H-dibenzo[b,f]-s-triazolo[4,3-d][1,4]diazepin-3-one In the manner given in Example 24, 2-[2-(phthalimido)-ethyl]-2,9-dihydro-9-methyl-3H-dibenzo[b,f]-s-triazolo-[4,3-d][1,4]diazepin-3-one was reacted with hydrazine hydrate in ethanol to give 2-[2-(amino)ethyl]-2,9-dihydro-9-methyl-3H-dibenzo[b,f]-s-triazolo[4,3-d][1,4]diazepin-3-one.

EXAMPLE 29

2-[2-(Benzylmethylamino)ethyl]-2,9-dihydro-9-methyl-3H-dibenzo[b,f]-s-triazolo[4,3-d][1,4]diazepin-3-one In the manner given in Example 27, 2,9-dihydro-9-methyl-3H-dibenzo[b,f]-s-triazolo[4,3-d][1,4]diazepin-3-one is first reacted with sodium hydride and the resulting product with N-benzyl-N-methyl-2-chloroethylamine to give 2-[2-(benzylmethylamino)ethyl]-2,9-dihydro-9-methyl-3H-dibenzo[b,f]-s-triazolo[4,3-d][1,4]diazepin-3-one.

EXAMPLE 30

2-[2-(Methylamino)ethyl]-2,9-dihydro-9-methyl-3H-dibenzo[b,f]-s-triazolo[4,3-d][1,4]diazepin-3-one In the manner given in Example 26 2-[2-(benzylmethylamino)ethyl]-2,9-dihydro-9-methyl-3H-dibenzo[b,f]-s-triazolo[4,3-d][1,4]diazepin-3-one is hydrogenated to give 2-[2-(methylamino)ethyl]-2,9-dihydro-9-methyl-3H-dibenzo-[b,f]-s-triazolo[4,3-d][1,4]diazepin-3-one.

In the manner illustrated in the preceding examples other thiones of formula I can be converted with an alkyl carbazate such as methyl, ethyl, propyl, or isopropyl carbazate to a diazepine of formula II and this can be further converted to a compound of formula III. Representative compounds, thus obtained, include:

6,12-dibromo-2,9-dihydro-3H-dibenzo[b,f]-s-triazolo[4,3-d]-[1,4]diazepin-3-one;

2-[3-(N-ethylpiperazin-4-yl)propyl]-2,9-dihydro-3H-dibenzo[b,f]-s-triazolo[4,3-d][1,4]diazepin-3-one;
2-(3-aminopropyl)-2,9-dihydro-3H-dibenzo[b,f]-s-triazolo-[4,3-d][1,4]diazepin-3-one;
5-chloro-2,9-dihydro-10-methyl-3H-dibenzo[b,f]-s-triazolo[4,3-d][1,4]diazepin-3-one;
2,9-dihydro-11-methylthio-3H-dibenzo[b,f]-s-triazolo-[4,3-d][1,4]diazepin-3-one;
13-fluoro-2,9-dihydro-3H-dibenzo[b,f]-s-triazolo[4,3-d]-[1,4]diazepin-3-one;
6-bromo-2,9-dihydro-3H-dibenzo[b,f]-s-triazolo[4,3-d][1,4]-diazepin-3-one;
12-chloro-2,9-dihydro-3H-dibenzo[b,f]-s-triazolo[4,3-d]-[1,4]diazepin-3-one;
2,9-dihydro-5-methyl-9-[2-(pyrrolidin-2-yl)ethyl]-3H-dibenzo[b,f]-s-triazolo[4,3-d][1,4]diazepin-3one;
2,9-dihydro-8-(isopropylthio)-3H-dibenzo[b,f]-s-triazolo-[4,3-d][1,4]diazepin-3-one;
8,12-difluoro-2,9-dihydro-3H-dibenzo[b,f]-s-triazolo[4,3-d][1,4]diazepin-3-one;
2,9-dihydro-9-methyl-6-propyl-3H-dibenzo[b,f]-s-triazolo-[4,3-d][1,4]diazepin-3-one;
2-[2-(N-ethylpiperazino)ethyl]-2,9-dihydro-3H-dibenzo[b,f]-s-triazolo[4,3-d][1,4]diazepin-3-one;
7,13-diethyl-2,9-dihydro-3H-dibenzo[b,f]-s-triazolo[4,3-d]-[1,4]diazepin-3-one;
5-(bromo-2,9-dihydro-3H-dibenzo[b,f]-s-triazolo[4,3-d]-[1,4]diazepin-3-one;
6,12-dichloro-9-(dimethylamino)methyl-2,9-dihydro-3H-dibenzo[b,f]-s-triazolo[4,3-d][1,4]diazepin-3-one;
9-[3-(ethylamino)propyl]-11-fluoro-2,9-dihydro-3H-dibenzo-[b,f]-s-triazolo[4,3-d][1,4]diazepin-3-one;
2,9-dihydro-3-methyl-9-(2-piperidonoethyl)-3H-dibenzo-[b,f]-s-triazolo[4,3-d][1,4]diazepin-3one;
6,12-dibromo-2-[3-(dimethylamino)propyl]-2,9-dihydro-3H-dibenzo[b,f]-s-triazolo[4,3-d][1,4]diazepin-3-one;
6,11-diamino-2,9-dihydro-2-(3-pyrrolidinopropyl)-3H-dibenzo[b,f]-s-triazolo[4,3-d][1,4]diazepin-3-one;
7,11-dichloro-2,9-dihydro-2-[3-(1-piperidinyl)propyl]-3H-dibenzo[b,f]-s-triazolo[4,3-d][1,4]diazepin-3-one;
2-[2-(diethylamino)ethyl]-5-fluoro-2,9-dihydro-10-methyl-3H-dibenzo[b,f]-s-triazolo[4,3-d][1,4]diazepin-3-one;
2-ethyl-2,9-dihydro-11-fluoro-3H-dibenzo[b,f]-s-triazolo-[4,3-d][1,4]diazepin-3-one;
13-fluoro-2,9-dihydro-2-methyl-3H-dibenzo[b,f]-s-triazolo-[4,3-d][1,4]diazepin-3-one;
6-bromo-2-[2-(dimethylamino)ethyl]-2,9-dihydro-3H-dibenzo-[b,f]-s-triazolo[4,3d][1,4]diazepin-3-one;
12-chloro-2-[2-(ethylamino)ethyl]-2,9-dihydro-3H-dibenzo-[b,f]-s-triazolo[4,3-d][1,4]diazepin-3-one;
2,9-dihydro-9-methyl-2-propyl-3H-dibenzo[b,f]-s-triazolo-[4,3-d][1,4]diazepin-3-one;
2,9-dihydro-8-(isopropylthio)-2-(methylaminoethyl)-3H-dibenzo[b,f]-s-triazolo[4,3-d][1,4]diazepin-3-one;
12-(diethylamino)-8-fluoro-2,9-dihydro-2-aminomethyl-3H-dibenzo[b,f]-s-triazolo[4,3-d][1,4]diazepin-3-one;
and the like.

Treatment of the compounds of formulae II and III with a pharmacologically acceptable acid such as hydrochloric, hydrobromic, phosphoric, sulfuric, acetic, propionic, toluenesulfonic, naphthalene-β-sulfonic, methanesulfonic, tartaric, citric, lactic, malic, maleic, or cyclohexanesulfamic (acids) produces the pharmacologically acceptable salts of these compounds of formulae II and III. The salts can be used for the same purposes as the free base compounds of formulae II and III.

Salt formation is achieved in conventional manner by reacting the compounds of formulae II or III with an excess of a selected acid in a suitable medium, e.g., water, alkanol, ether, or acetone and recovering the salt by evaporating the solvent, preferably in vacuo.

I claim:

1. A compound selected from the group consisting of triazoloazepines of the formula III:

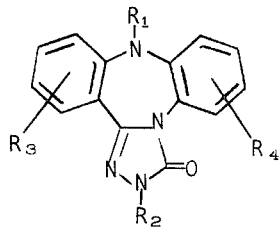

III wherein $R_1$ is hydrogen, alkyl of 1 to 3 carbon atoms, inclusive,

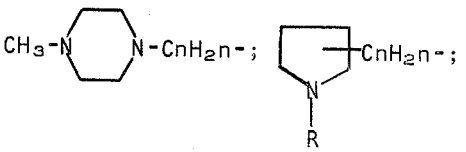

and

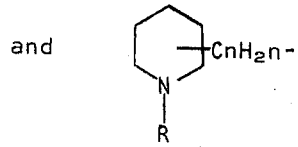

in which $n$ is 2 or 3, inclusive, and R is alkyl defined as above, or $R_1$ is

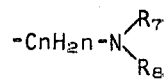

in which $n$ is defined as above, $R_7$ and $R_8$ are hydrogen or alkyl, as defined above, and $n$ is defined as above, or together

is pyrrolidino or piperidino; wherein $R_2$ has the same significance as $R_1$; and wherein $R_3$ and $R_4$ are hydrogen, fluoro, chloro, bromo, alkyl defined as above, trifluoromethyl, or alkylthio of 1 to 3 carbon atoms, inclusive, and the pharmacologically acceptable acid addition salts thereof.

2. A compound according to claim 1 of the formula:

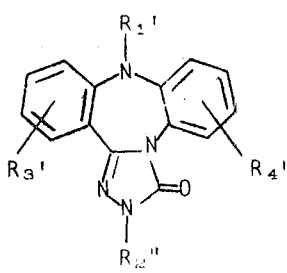

wherein $R_1'$ is hydrogen, alkyl of 1 to 3 carbon atoms, inclusive or

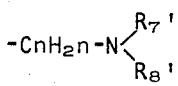

in which $n$ is 2 or 3 and $R_7'$ and $R_8'$ are hydrogen or alkyl defined as above; wherein $R_2''$ is hydrogen, alkyl as defined above,

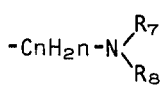

defined as above; or

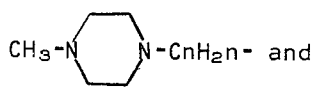 and 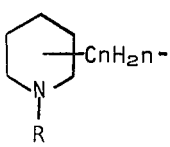

in which n is defined as above, and R is hydrogen or methyl; wherein $R_3'$ and $R_4'$ are hydrogen, fluorine, chlorine, or bromine, and the pharmacologically acceptable acid addition salts thereof.

3. A compound according to claim 1 of the formula

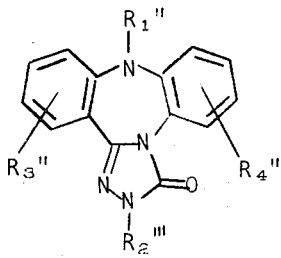

wherein $R_1''$ is hydrogen, alkyl of 1 to 3 carbon atoms, inclusive, or

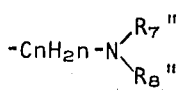

in which $n$ is 2 or 3, and $R_7''$ and $R_8''$ are alkyl defined as above; wherein $R_2'''$ is hydrogen,

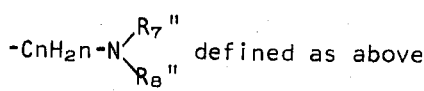 defined as above or 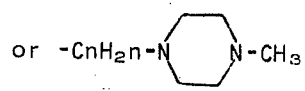

in which $n$ is defined as above; and wherein $R_3''$ and $R_4''$ are hydrogen or chlorine and the pharmacologically acceptable acid addition salts thereof.

4. A compound according to claim 3, wherein $R_1''$, $R_2'''$, $R_3''$, and $R_4''$ are hydrogen, and the compound is therefore 2,9-dihydro-3H-dibenzo[b,f]-s-triazolo[4,3-d][1,4]diazepin-3-one.

5. A compound according to claim 3 wherein $R_2'''$ is 2-(dimethylamino)ethyl, $R_1''$, $R_3''$, and $R_4''$ are hydrogen, and the compound is therefore 2-[2-(dimethylamino)ethyl]-2,9-dihydro-3H-dibenzo[b,f]-s-triazolo[4,3-d][1,4]diazepin-3-one.

6. A compound according to claim 3, wherein $R_2'''$ is 3-(dimethylamino)propyl, $R_1''$, $R_3''$, and $R_4''$, are hydrogen, and the compound is therefore 2-[3-(dimethylamino)propyl]-2,9-dihydro-3H-dibenzo[b,f]-s-triazolo[4,3-d][1,4]diazepin-3-one.

7. A compound according to claim 3 as the hydrochloride salt wherein $R_1''$ and $R_3''$ are hydrogen, $R_2'''$ is 2-(dimethylamino)ethyl, $R_4''$ is 7-chloro and the compound is therefore 7-chloro-2-[2-(dimethylamino)ethyl-2,9-dihydro-3H-dibenzo-[c,f]-s-triazolo[4,3-d][1,4]diazepine-3-one hydrochloride.

8. A compound according to claim 2 wherein $R_2''$ is 3-(4-methyl-1-piperazinyl)propyl, $R_1'$, $R_3'$, and $R_4'$ are hydrogen, and the compound is therefore 2,9-dihydro-2-[3-(4-methyl-1-piperazinyl)propyl]-3H-dibenzo[b,f]-s-triazolo[4,3-d][1,4]diazepin-3-one.

9. The compound of claim 8 as a hydrochloric acid addition salt.

10. A compound according to claim 3, wherein $R_1''$ is 3-(dimethylamino)propyl; $R_2'''$, $R_3''$, and $R_4''$ are hydrogen and the compound is therefore 9-[3-(dimethylamino)propyl]-2,9-dihydro-3H-dibenzo[b,f]-s-triazolo[4,3-d][1,4]diazepin-3-one.

11. A compound according to claim 3 wherein $R_1''$ is methyl, $R_2'''$, $R_3''$ and $R_4''$ are hydrogen and the compound is therefore 2,9-dihydro-9-methyl-3H-dibenzo[b,f]-s-triazolo[4,3-d][1,4]diazepin-3-one.

12. A compound according to claim 3, wherein $R_1''$ is methyl, $R_2'''$ is 2-(dimethylamino)ethyl, $R_3''$ and $R_4''$ are hydrogen and the compound is therefore 2-[2-(dimethylamino)ethyl]-2,9-dihydro-9-methyl-3H-dibenzo[b,f]-s-triazolo[4,3-d][1,4-diazepin-3-one.

13. The hydrochloric acid addition salt of the compound of claim 12.

14. A compound according to claim 3 wherein $R_1''$, $R_3''$ and $R_4''$ are hydrogen, $R_2'''$ is 2-(amino)ethyl-, and the compound is therefore 2-[2-(amino)ethyl]-2,9-dihydro-3H-dibenzo-[b,f]-s-triazolo[4,3-d][1,4]diazepine-3-one.

15. A compound according to claim 3 wherein $R_1''$, $R_3''$ and $R_4''$ are hydrogen, $R_2'''$ is 2-(methylamino)ethyl, and the compound is therefore 2-[2-(methylamino)ethyl]-2,9-dihydro-3H-dibenzo[b,f]-s-triazolo[4,3-d][1,4]diazepine-3-one.

16. A compound according to claim 1 wherein $R_1$ is methyl, $R_2$ is 2-(amino)ethyl, $R_3$ and $R_4$ are hydrogen and the compound is therefore 2-[2-(amino)ethyl]-2,9-dihydro-9-methyl-3H-dibenzo[b,f]-s-triazolo[4,3-d][1,4]diazepine-3-one.

17. A compound according to claim 1 wherein $R_1$ is methyl, $R_2$ is 2-(methylamino)ethyl, $R_3$ and $R_4$ are hydrogen and the compound is therefore 2-[2-(methylamino)ethyl]-2,9-dihydro-9-methyl-3H-dibenzo[b,f]-s-triazolo[4,3-d][1,4]diazepine-3-one.

* * * * *

UNITED STATES PATENT OFFICE
CERTIFICATE OF CORRECTION

Patent No. 3,862,950             Dated January 28, 1975

Inventor(s) Jacob Szmuszkovicz

It is certified that error appears in the above-identified patent and that said Letters Patent are hereby corrected as shown below:

Column 3, line 40 "compound IR formula" should read
-- compound of formula --.
Column 5, line 1 "others can be seen" should read
-- others as can be seen --.
Column 5, line 40 "yohibine" should read -- yohimbine --.
Column 8, line 37 "5,10-dihydro5-" should read
-- 5,10-dihydro-5- --.
Column 11, line 14 "$C_{19}H_{12}N_5O$" should read -- $C_{19}H_{21}N_5O$ --.
Column 12, line 15 "of 5-(3-" should read -- of 5-[3- --.
Column 12, line 61 "diazepin-11thione" should read
-- diazepin-11-thione --.
Column 14, line 32 "dibenzo[b-,e]-[1,4]" should read
-- dibenzo[b,e][1,4] --.
Column 16, line 33 "imido)-ethyl]-2,9" should read
-- imido)ethyl]-2,9 --.
Column 17, line 52 "[4,3d]" should read -- [4,3-d] --.
Column 20, line 13 "amino)ethyl-2,9" should read
-- amino)ethyl]-2,9 --.

Signed and Sealed this

Seventh Day of March 1978

[SEAL]

Attest:

RUTH C. MASON
Attesting Officer

LUTRELLE F. PARKER
Acting Commissioner of Patents and Trademarks